(12) United States Patent
Cocchi et al.

(10) Patent No.: US 8,591,097 B2
(45) Date of Patent: Nov. 26, 2013

(54) MACHINE FOR PRODUCING AND DISPENSING LIQUID OR SEMI-LIQUID CONSUMER FOOD PRODUCT

(75) Inventors: Gino Cocchi, Milan (IT); Gianni Zaniboni, Milan (IT); Roberto Lazzarini, Milan (IT)

(73) Assignee: Carpigiani Group—ALI S.p.A. (IT)

( * ) Notice: Subject to any disclaimer, the term of this patent is extended or adjusted under 35 U.S.C. 154(b) by 1031 days.

(21) Appl. No.: 12/385,327

(22) Filed: Apr. 6, 2009

(65) Prior Publication Data

US 2009/0323462 A1     Dec. 31, 2009

(30) Foreign Application Priority Data

Jun. 30, 2008 (IT) .............................. MI2008A1214

(51) Int. Cl.
*B01F 15/06*     (2006.01)
(52) U.S. Cl.
USPC ........................................................ 366/147

(58) Field of Classification Search
USPC ............................................................ 366/147
See application file for complete search history.

(56) References Cited

U.S. PATENT DOCUMENTS

| 2,299,414 A * | 10/1942 | Spiegl .............................. 62/123 |
| 5,199,278 A * | 4/1993 | Cocchi ............................. 62/343 |
| 6,220,047 B1 * | 4/2001 | Vogel et al. ...................... 62/342 |
| 6,830,440 B1 * | 12/2004 | Riddoch ....................... 417/353 |
| 2003/0080644 A1 * | 5/2003 | Nelson et al. ................. 310/196 |

* cited by examiner

*Primary Examiner* — Yogendra Gupta
*Assistant Examiner* — John Robitaille
(74) *Attorney, Agent, or Firm* — Timothy J. Klima; Shuttleworth & Ingersoll, PLC

(57) ABSTRACT

A machine for producing and dispensing liquid or semi-liquid consumer food products, comprising: a tank (2) for holding a liquid base product; a treatment circuit (10) for said liquid base product, so as to obtain a liquid or semi-liquid food product; means (30) for dispensing said food product; one or more actuators (40) acting on said base product, said food product and/or parts of said machine (1). At least one of said one or more actuators (40) is a brushless motor (41).

16 Claims, 4 Drawing Sheets

MACHINE FOR PRODUCING AND DISPENSING LIQUID OR SEMI-LIQUID CONSUMER FOOD PRODUCT

FIELD AND BACKGROUND OF THE INVENTION

The present invention relates to a machine for producing and dispensing liquid or semi-liquid consumer food products.

The invention in particular refers, although this does not represent a limitation, to machines for production and distribution of water-ices, sorbets, ice-creams, soft ice-creams, cream, chocolate, yogurts and the like and to machines for production and preservation of mixtures for ice-cream, chocolate, creams, sauces, soups and mixtures in general, and the like.

As known, these machines comprise a holding tank for a liquid base product, and a treatment circuit for the base product, for obtaining said consumer food product. The latter can be then dispensed by means of suitable delivery devices and/or kept in a preservation tank.

The treatment circuit may comprise, depending on the type of machine taken into consideration, thermal treatment means, to cool or heat the product, a whisking cylinder to keep the product to a given viscosity degree, mixing means to mix the base product with an auxiliary product, such as flavorings, etc.

Generally, the machines are provided with a plurality of actuators, interlocked with a control unit so that the different working steps according to a preset program are carried out on the base product.

Known machines are generally provided with a protection or shield enabling the operators to accede to the batch freezing chamber where an ice-cream for example is being batch frozen.

It may happen that the shield is opened while the machine is working, i.e. while a stirrer that is inside the batch freezing chamber is rotating about its axis. The machine can be provided with a control system that when the shield is opened during operation of the machine, carries out switching off of the motor dedicated to movement of the stirrer, so that the risks of the operator being injured are prevented (or at least reduced).

It should be however noted that, in spite of the presence of this safety system, due to the inertia of the mass associated with the rotating system, stopping of the stirrer in a reasonably quick time is impossible so that there is a non-negligible risk for the operator being injured.

A further drawback characteristic of the machines of known type resides in that an ice layer tends to be formed on the inner surface of the batch freezing chamber, due to the presence of the evaporator of the refrigerating circuit exactly in register with the outer surface of said chamber. Ice formation, in addition to impairing heat exchange, tends to hinder correct operation of the stirrer and therefore adversely affects the quality of the obtained food product.

Presently available are scraping elements for removal of the ice layer which are mounted on the stirrer's outer profile. These elements however are not able to efficiently work and do not allow full removal of the ice tending to be formed within the whisking implement.

Another disadvantage of the machines according to the known art comes out if it is considered that sometimes a homogeneous and compact ice-cream block is formed close to the stirrer's center which does not enable a correct texture to be obtained and therefore adversely affects both the organoleptic features of the product and the time required for terminating preparation of same; sometimes due this ice-cream block the batch freezing operation on the ice-cream cannot be completed, which will bring about a greater energy consumption by the actuator dedicated to actuation of said stirrer.

Removal of this ice-cream block is presently very complicated and time-consuming, as it is necessary to stop the process, bring the ice-cream mixture to the liquid state again and restart with a new batch freezing cycle.

OBJECTS AND SUMMARY OF THE INVENTION

Accordingly, the present invention aims at providing a machine for producing and dispensing liquid or semi-liquid consumer food products enabling safety for the operators charged with control and maintenance of the machine to be increased, in particular if an attempt to accede to the inside of the batch freezer is made during operation of the machine.

Another aim of the invention is to make available a machine for producing and dispensing liquid or semi-liquid consumer food products in which the efficiency and quality of removal of the ice layers tending to be formed on the inner wall of the batch freezer are improved.

It is a further aim of the invention to provide a machine for producing and dispensing liquid or semi-liquid consumer food products in which, when ice-creams of the like are produced, the accumulated product tending to be formed at the central portion of the stirrer can be separated therefrom and removed in a simple and quick manner.

In accordance with the invention, these aims are achieved by a machine for producing and dispensing liquid or semi-liquid consumer food products comprising the technical features set out in one or more of the appended claims.

The technical features of the invention, in accordance with the above aims, can be clearly found in the contents of the appended claims, and the advantages of same will be more apparent in the following detailed description, taken with reference to the accompanying drawings representing an embodiment thereof given by way of non-limiting example.

BRIEF DESCRIPTION OF THE DRAWINGS

In particular.

DESCRIPTION OF THE PREFERRED EMBODIMENTS

Figure 1:
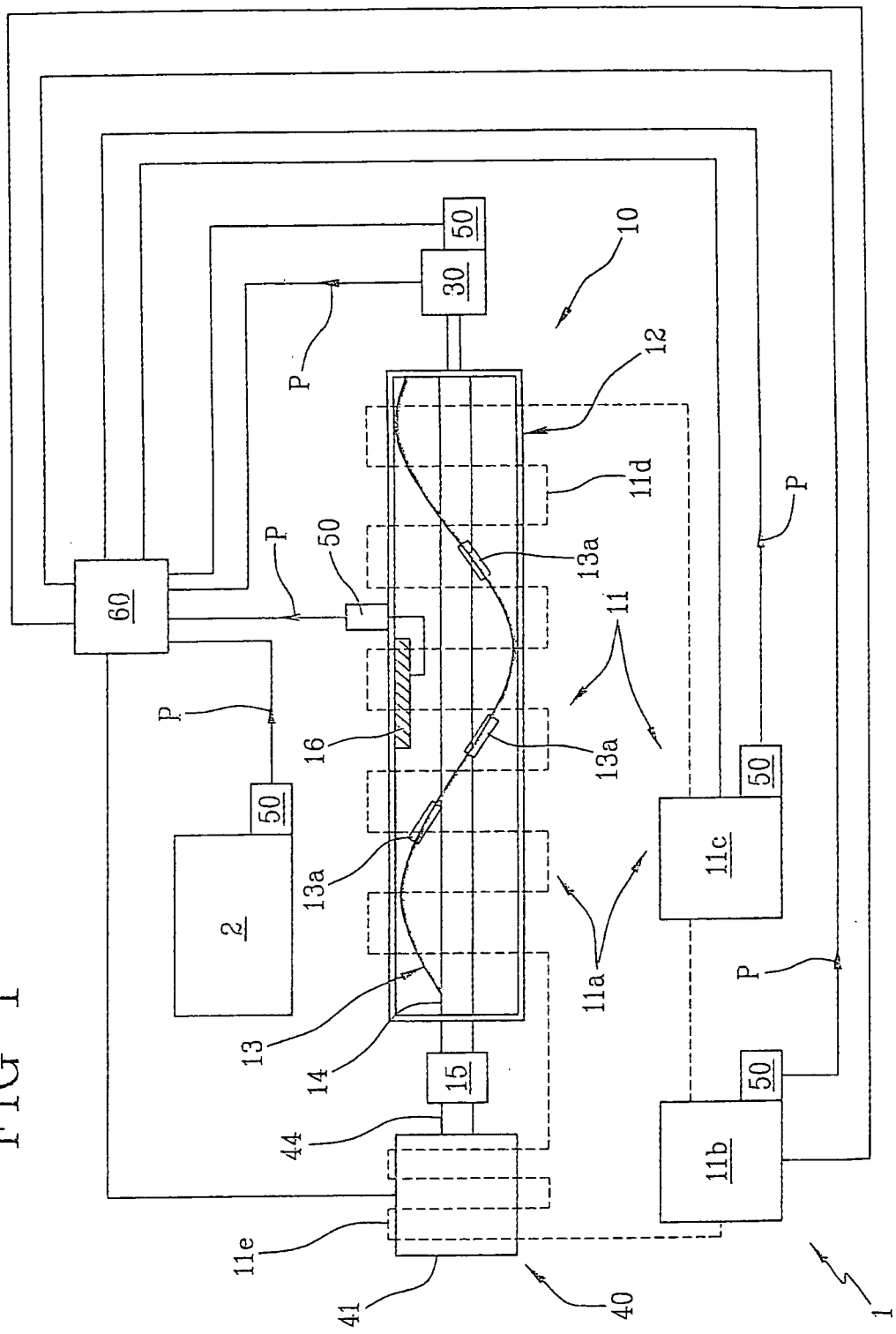
FIG. 1 is a block diagram of the machine in accordance with the present invention.

With reference to the attached drawings, a machine in accordance with the invention has been generally identified by reference numeral 1.

Said machine 1 first of all comprises a holding tank 2 for the liquid base product.

The liquid base product can be, by way of example only, either a liquid cream, or a mixture of products for ice-cream, shake, water-ice, or also a syrup; generally, the liquid base product can be any liquid product used for production of a liquid or semi-liquid finished food product.

The finished food product can be, by way of example only, water-ice, sorbet, ice-cream, soft ice-cream, liquid cream, yogurt, yogurt-ice-cream, mixture for ice-cream, chocolate, cream, sauce, soup, mixtures in general, and the like.

The finished product can also be an ice-cream shake or shake; by the term "ice-cream shake" or "shake" it is intended any frozen food product or "semifreddo" of neutral taste, also defined as "neutral ice-cream", whipped together with a flavoring syrup of the desired taste and possibly having the addition of soft parts consisting of fruit pulp or of solid parts such as seeds and the like.

It should be noted that said holding tank 2, depending on requirements and on the type of machine in which it is used, can have a major extension in a horizontal or vertical direction, in use; tank 2 can also consist of a box-shaped structure having at least one open side, or a substantially "closed" box-shaped structure.

For obtaining the final product starting from the base product, machine 1 comprises a treatment circuit 10. The treatment circuit 10 in turn can comprise thermal treatment means 11, to cool/heat the base product and/or the finished product; the thermal treatment means 11 can also be provided for the purpose of keeping the base product and/or finished product to a predetermined temperature.

The treatment circuit 10 can comprise a dispensing device or a whipping extruder, in particular if the finished product consists of whipped cream.

The treatment circuit 10 can comprise a cooling and mixing unit 19, to mix the product and keep it to (or make it reach) a given temperature.

For instance, the cooling and mixing unit 19 can comprise a batch freezing device or batch freezer 12, in particular should the finished product consist of ice-cream.

The treatment circuit 10 can comprise a mixing unit, in particular should the finished product consist of ice-cream shake or shake.

The machine 1 further comprises dispensing means 30, suitably set to enable dispensing of the finished product, and preferably connected downstream of the treatment circuit 10, and in particular of the batch freezer 12.

The dispensing means 30 may consist of nozzles or taps, for example; the dispensing means 30 can be adjusted manually or by means of suitable electronic control means co-operating with a sensor adapted to detect the amount of dispensed finished product, so as to state the instant at which the dispensing means must be automatically switched off.

The machine 1 further comprises one or more sensors 50 for detecting one or more operating parameters P of said machine. These operating parameters P can be, by way of example, temperatures (of the base product, the finished product, the thermal treatment circuit or specific regions of the inside of machine 1), pressures (within the ducts or vessels where the different products can be), levels or amounts (of products present within the machine or dispensed through the dispensing means), currents and/or voltages (representative of the different circuits and electric/electronic devices present in the machine 1, such as actuators, for example, to which reference will be made below), measured magnetic fields in terms of polarity and intensity magnitudes, movement speed of the products inside the machine or moving parts of the machine, physical features of the base product and/or the finished product (e.g. consistency), state variables of the different members, switches, actuators present in machine 1, etc.

Parameters P can be for example used by the control unit 60 to be better described in the following, designed to control and regulate the machine operation.

Machine 1 comprises one or more actuators 40, acting on the base product, the finished product and/or parts of the machine 1. Preferably, actuators 40 are part of said treatment circuit 10 or are associated therewith.

It should be noted in the present context that by the term actuators it is intended to mean all devices or members acting on the base product, finished product, possible intermediate products so as to vary any physical or mechanical, static or dynamic feature of same; in the present context said actuators can also comprise any device or member capable of actively operating on any component of the machine 1.

By way of example only, termed actuators can be the devices adapted to cause advancing of the base product along the treatment circuit, the devices carrying out batch freezing of the finished product or mixing of two or more base or intermediate products, the devices adapted to thermally treat the products present in the machine 1, to increase, reduce or stabilize temperature of same, the automatic devices for dispensing the finished products, the devices (such as a gear pump) for air pressurization of the liquid mixture constituting the base product for the so-called "soft ice-cream", to give the finished product a more or less marked creamy character, etc.

In particular, at least one of said actuators 40 is dedicated to driving in rotation a stirrer 13 being part of said cooling and mixing unit 19. Stirrer 13 can be mounted on the inside of the batch freezer chamber 12a of a batch freezer 12, for example.

In a different embodiment, stirrer 13 can be mounted on the outside of a cylindrical surface 18a provided in a water-ice-making device 18.

Referring specifically to production of ice-creams, batch freezer 12 has the function of keeping the product creamy also against an important temperature reduction of same; more particularly, depending on the rotation speed of stirrer 13, the product can be combined with different air amounts, so that correspondingly finished products of different creamy character are obtained.

Advantageously, actuator 40 is a brushless motor 41. The brushless motor 41 (diagrammatically shown in FIG. 2) is provided with a stator 42, substantially integral with the structure of machine 1, and a rotor 43, drivable in rotation relative to stator 42.

Figure 2:
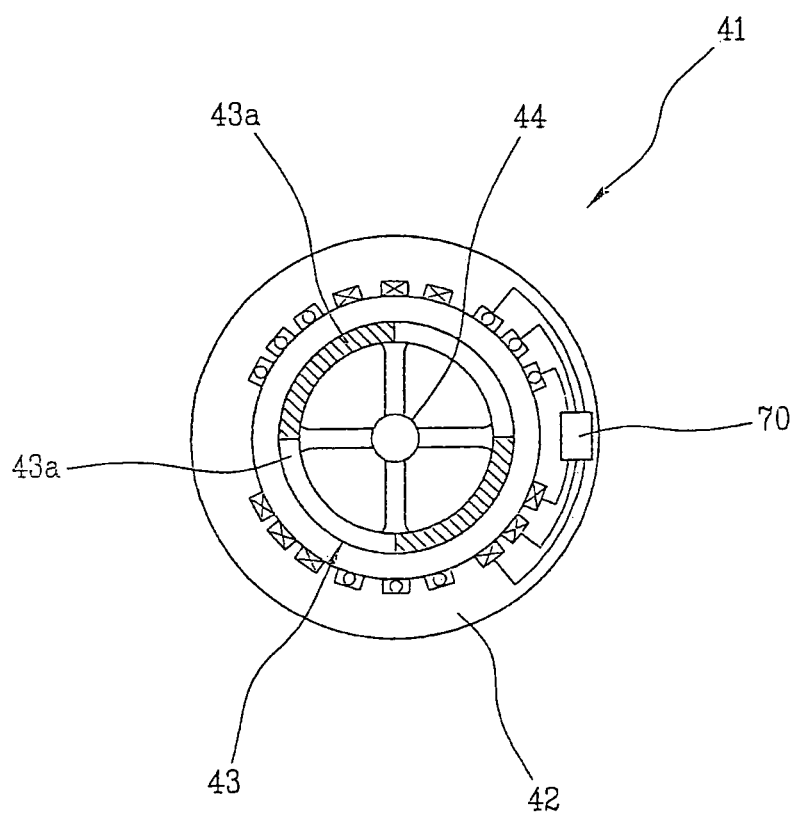
FIG. 2 diagrammatically shows a device being part of the machine seen in FIG. 1.
Figure 3A:
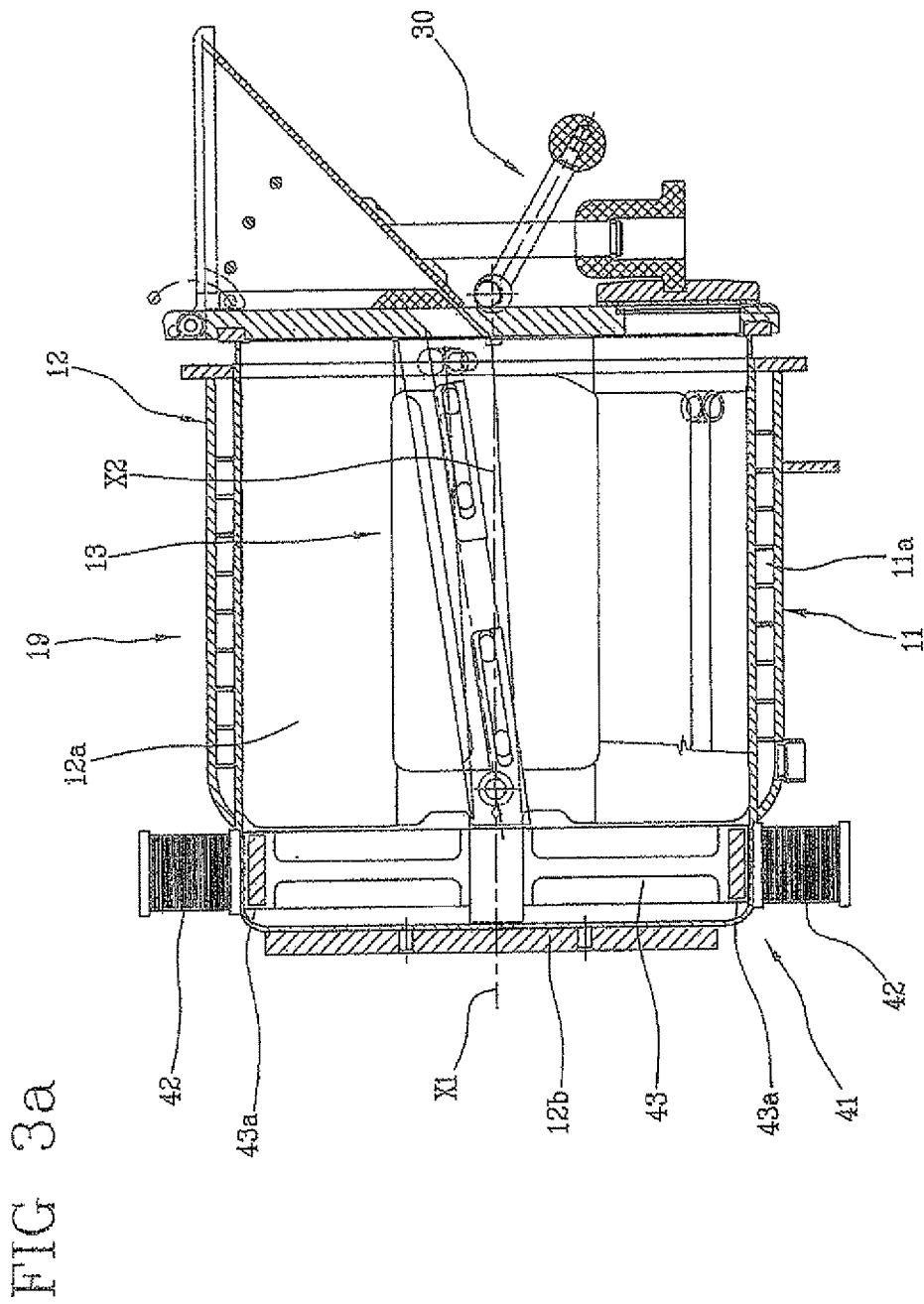
FIG. 3a diagrammatically shows a sectional side view of an alternative embodiment of another device being part of the machine seen in FIG. 1.

Diagrammatically shown in FIG. 2 is a brushless motor in which stator 42 is at a radially external position relative to rotor 43; this structure can be advantageously used in the embodiment of the invention shown in FIG. 3a.

Figure 3B:
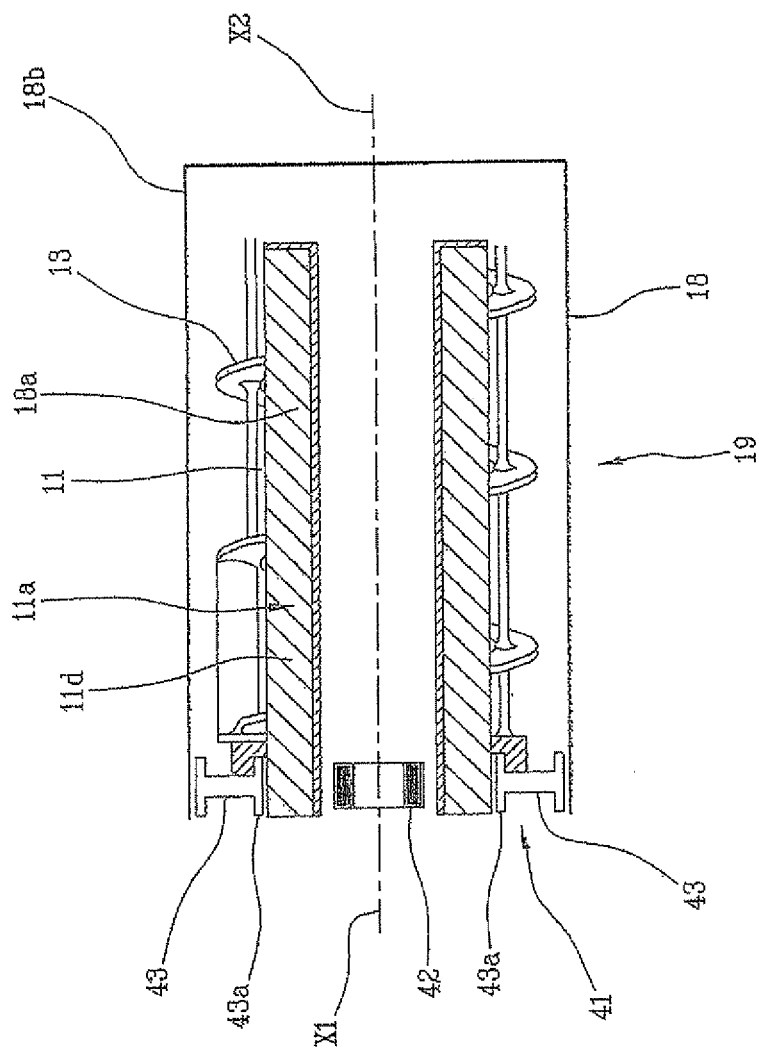
FIG. 3b diagrammatically shows a further alternative embodiment of the invention with some parts removed for a better view of others.

At all events, the brushless motor 41 is provided to have a structure in which rotor 43 is at a radially external position relative to stator 42; this structure can advantageously be used in the embodiment of the invention shown in FIG. 3b.

In some embodiments, stirrer 13 can have a rotation shaft 14. The brushless motor 41 has a first rotation axis X1; stirrer 13 has a second rotation axis X2. Preferably, the first and second rotation axes X1, X2 are coincident.

Preferably, the brushless motor 41 acts on stirrer 13 for driving the latter in rotation around its rotation axis X2. In more detail, the brushless motor 41 is provided with an output shaft 44 substantially integral with said rotor 43; the output shaft 44 of the brushless motor 41 can be directly connected to stirrer 13.

In the preferred embodiment, the output shaft 44 of the brushless motor 41 and the rotation shaft 14 of stirrer 13 are substantially coaxial.

More preferably, the output shaft 44 of the brushless motor 41 is coincident with the rotation shaft 14 of stirrer 13. In this case, one or more permanent magnets 43a can be mounted on the rotation shaft 14 of stirrer 13, so as to define rotor 43 of the brushless motor 41.

Advantageously, under this situation the same bearing 15 can be used for support of the shaft defining both the rotation shaft of the brushless motor 41 and the rotation shaft of stirrer 13.

In addition, particularly due to direct connection between motor 41 and stirrer 13, bulkiness inside the machine 1 and energy consumption can be both reduced, since power losses are eliminated due to the absence of connecting kinematic mechanisms (belts, pulleys, cog wheels, worm screws, etc.).

Furthermore, since the brushless motor 41 is directly connected to stirrer 13, the ratio of the angular speed of the motor to the angular speed of the stirrer is substantially 1:1. This involves operation of the brushless motor to an angular speed undoubtedly lower than the motors of known type (induction motors, for example), and the useful life of motor 41 is greatly increased.

Also greatly improved is the noiselessness of machine 1, above all due to the absence of transmission gears and mechanical intermediate controls between motor 41 and stirrer 13.

Generally, application of a brushless motor 41 to stirrer 13 of the batch freezer 12 allows the batch freezing cycle to be optimized because, by virtue of the reduced inertia and high dynamics, the load can be followed in a precise manner.

Furthermore, due to use of a brushless motor 41, production of motors substantially having the same diameter is allowed, irrespective of the mechanical power and torque that have to be then supplied.

Power can be determined by the longitudinal size of the motor, i.e. the size along the direction substantially defined by the rotation axis of the motor output shaft.

FIG. 3a diagrammatically shows an embodiment in which the cooling unit 19 comprises a batch freezer 12.

As can be seen, the batch freezer 12 comprises a batch freezer chamber 12a inside which stirrer 13 is housed. Preferably, stirrer 13 is not provided with a rotation shaft; in fact stirrer 13 can be housed and supported inside the batch freezer chamber 12a (the latter having a substantially cylindrical inner conformation) also without a shaft extending over the whole longitudinal extension of stirrer 13.

Rotor 43, and in particular the permanent magnets 43a are housed inside the batch freezer chamber 12a and directly connected to stirrer 13.

Stator 42 is on the contrary mounted externally of the batch freezer chamber 12a, close to rotor 43 and in particular at a radially external position relative to said rotor.

Preferably stator 42 has a substantially annular structure, positioned externally of rotor 43 so that stator 42 and rotor 43 are substantially coaxial.

Advantageously, the cylindrical side wall of the batch freezer 12 is made of a material allowing electromagnetic interaction between rotor 43 and stator 42 and therefore correct operation of the brushless motor 41.

The solution diagrammatically shown in FIG. 3 allows particular advantages to be achieved in terms of bulkiness, since along the longitudinal extension direction X2 of stirrer 13 the different elements therein present are very compact.

In addition, due to the absence of a mechanical connection between stator 42 and rotor 43, and also to the absence of a rotation shaft being part of stirrer 13, formation of holes in the base wall 12b of the whisking batch freezer chamber 12a is avoided, which will avoid using sealing elements and will prevent possible escape of the product.

It is therefore apparent that a solution of this type is simplified as compared with known structures, and allows costs for manufacturing the machine 1 to be reduced.

FIG. 3b shows an alternative embodiment of the invention, applied to a machine 1 for producing water-ices.

In this case the cooling and mixing unit 19 is part of a water-ice making device 18.

Preferably said device 18 is provided with a substantially cylindrical structure 18a in which at least stator 42 of the brushless motor 41 is housed.

Preferably, thermal treatment means 11 is also housed within the cylindrical structure 18a, and in particular at least part of the refrigerating device 11a to be better described in the following.

Advantageously, housed within the cylindrical structure 18a is at least one heat exchanger or evaporator lid being part of said refrigerating circuit 11a. Rotatably mounted at the outside of the cylindrical structure 18a is rotor 43.

In particular, the permanent magnets 43a of rotor 43 are mounted to a radially external position axially corresponding to that of stator 42.

Rotor 43 is connected and preferably substantially integral with stirrer 13, so as to drive the latter in rotation due to the electromagnetic interaction with stator 42.

Advantageously, the cylindrical structure 18a is made of a material enabling electromagnetic interaction between the internally mounted stator 42, and the externally mounted rotor 43.

The hitherto described structure is preferably housed in a box-shaped holding body 18b in which the product (water-ice) is, which product is mixed and maintained to the correct temperature by the cooling and mixing unit 19.

Preferably, rotor 43 is not provided with a rotation shaft; rotor 43 in fact can be supported and be in sliding relationship with the outer surface of the cylindrical structure 18a and/or the inner surface of the box-shaped body.

Preferably, machine 1 further comprises an electronic control unit 60, at least acting on said one or more actuators 40 to regulate operation of same. Practically, the control unit 60 can be an electronic control card of known type, suitably set to cause operation of machine 1 following a preset program, for the purpose of obtaining the finished product starting from one or more base products.

Advantageously, the control unit regulates operation of actuators 40 and in particular of the brushless motor 41, depending on currents and/or voltages absorbed by them.

In this way a control technique of the "sensorless" type is implemented in which actuators 40, and in particular the brushless motor 41, are controlled without the aid of detecting devices such as resolvers, for example.

It is apparent that, as a result, a machines is obtained of simple and cheap construction as compared with the machines available on the market.

The "sensorless" control technique can be used as an alternative to, or in combination with the above mentioned sensors 50, depending on the requirements of each specific case.

In particular, the "sensorless" technique can be advantageously used for detecting operating parameters of the brushless motor 41, while one or more sensors 50 can be used for detecting parameters P relating to other actuators, devices or elements of the machine 1.

For instance, a sensor 50 can be associated for detecting the open/closed condition of a port 16 for access to the whisking implement 12.

The control unit 60 is operatively associated with said sensor 50 and the brushless motor 41, so that if port 16 is opened while the machine 1 is working, and in particular while the brushless motor 41 is moving stirrer 13, motor 41 is switched off, in order to minimize the risk of the operator who has opened said port 16 being injured.

Advantageously, since rotor 43 of the brushless motor is lightweight and therefore has a very low inertia, motor 41 can be stopped in a period of time by one order of magnitude quicker than known machines, thus minimizing said risks of injuries.

A further advantageous aspect connected with use of the brushless motor 41 relates to the fact that sometimes, above all during production of ice-creams and the like, in the central portion of the stirrer (i.e. the axially closest portion to the rotation shaft of said stirrer) an accumulation of very compact product is formed that makes stirrer heavier and slows down movement of same.

Due to use of the brushless motor 41 speed of stirrer 13 can be increased and/or the stirrer rotation direction can be reversed in a very short period of time, so as to enable a substantially immediate and very simple separation therefrom of the accumulated product that therefore can be submitted to batch freezing again under optimal conditions.

As above said, the treatment circuit 10 can comprise thermal treatment means 11, acting on the base product and/or the food product to adjust temperature of same. In more detail, the thermal treatment means 11 can consist of a refrigerating circuit 11a along which a refrigerating fluid flows.

The refrigerating fluid 11a is preferably provided with the following elements:
- a compressor 11b the function of which is to maintain the correct pressure in the refrigerating circuit 11a so as to enable circulation of the refrigerating fluid;
- a condenser or gas cooler 11c adapted to draw heat from the refrigerating fluid which is used to enable the fluid to condense;
- a heat exchanger or evaporator 11d, used for "producing cold" and therefore cooling the base product, finished product and/or intermediate products.

Evaporator 11d is advantageously associated with the batch freezer 12 so that the food product is maintained to a sufficiently low temperature during the batch freezing operation.

Preferably, evaporator lid or an auxiliary evaporator being part at all events of the refrigerating circuit 11a, is associated with the brushless motor 41, and in particular with stator 42, for cooling the latter.

By way of example, a pipe coil 11e can be provided which is connected to or is part of the refrigerating circuit 11a and at least partly externally surrounds motor 41. In this way, the motor sizes (in particular the sizes of the copper and iron motor parts) can be reduced and/or the torque that can be supplied by the motor can be increased.

In addition, through use of the refrigerating fluid for cooling the brushless motor 41, possible liquid residual products left in the suction line can be fully evaporated (overheated), thereby reducing carrying along of liquid cooler that could damage the compressor.

It should be noted that use of the refrigerating fluid for motor cooling can be also provided for actuators that are not brushless motors, but other types of electric motors.

Furthermore, due to cooling of stator 42 through said refrigerating fluid, the power devices of the driver can be integrated into stator 42. In other words, for adjusting operation and feeding of motor 41, use of one or more electronic power devices 70 is preferred; the latter, in combination with electronic low-power control circuits constitute the so-called "driver" of the motor.

The power devices are generally separated from the stator, and such arranged as to obtain a heat dissipation sufficient to enable said devices to correctly operate without being submitted to malfunction, due to too great temperature increases.

Vice versa, in the context of the present invention, by virtue of the above mentioned cooling of stator 42, these power devices 70 can be integrated into stator 42 without important problems arising due to not suitably dissipated heat.

Advantageously, the brushless motor 41 can be designed and sized so that it has a non negligible "cogging". In particular, cogging of the brushless motor 41 can be of at least 20%; for example, cogging of the brushless motor 41 can be of about 30%. This means that for each "stepping", the rotor supplies a torque that can be higher by 20%, for instance higher by 30%, than the nominal torque supplied by the motor under ideal conditions.

The cogging phenomenon is essentially due to the fact that each magnet 43a of rotor 43, during its movement alternately faces either a winding of stator 42 or a stator portion without winding. More generally, each magnet 43a periodically and in succession faces stator teeth having a different intensity and direction of the magnetic flux. In consequence of this phenomenon, rotor 43 carries out a non-homogeneous and even rotation but a "stepping" rotation.

Generally, in designing and manufacturing brushless motors, attempts are made to someway compensate for the cogging phenomenon (for instance, through the so-called rotor "skewing"), to make the rotor movement as regular and even as possible.

On the contrary, in the context of the present invention the cogging phenomenon can be advantageously utilized for removal of the ice layer tending to be formed on the inner surface of the batch freezer 12.

In fact, the radially external profile of stirrer 13 has one or more scrapers 13a for ice removal. These scrapers 13a, made either of an acetal resin or a copper-nickel metal alloy for instance, or of other material with a sufficient friction coefficient and sufficiently hygienic to be put into contact with a food product, are substantially in contact with the inner surface of the batch freezer 12 and slide against said surface for the purpose of removing said ice formation.

By utilizing said cogging phenomenon, it is possible to cause each scraper 13a to engrave on the ice formation more efficiently at each stepping (by in particular impinging on the ice with a concentrated energy during a shorter period of time), thus improving the quality of the activity for removal of said ice layers.

This result can be for instance achieved by use of trapezoidal voltage and current profiles instead of sinusoidal for powering said brushless motor.

The invention achieves important advantages.

First of all, the machine in accordance with the invention allows the operators in charge to work under safer conditions, in particular should an attempt be made to accede to the inside of the batch freezer during operation of the machine.

In addition, the machine 1, due to the structure above described and hereinafter claimed allows the batch freezing cycle to be optimized.

Another advantage resides in the facility and efficiency with which the block of product that is formed in the central portion of the stirrer can be removed. In addition, also removed with ease and efficiency is the ice formation on the inner wall of the batch freezer.

Furthermore, due to use of brushless motors, the motor diameter can be maintained constant, the supplied mechanical power being modulated through the longitudinal size of said motor, and in particular of the rotor magnets.

The invention as conceived is clearly susceptible of industrial application; it can also be submitted to many modifications and variants all falling within the scope of the inventive idea; in addition, all details can be replaced by technically equivalent elements.

What is claimed is:

1. A machine for producing and dispensing ice cream, comprising: a holding tank for a liquid base product; a treatment circuit for said liquid base product, so as to obtain ice cream, said treatment circuit comprising a batch freezer provided with at least one stirrer, a mechanism for dispensing said ice cream; at least one actuator acting on at least one chosen from said base product, said ice cream and parts of said machine, wherein said at least one actuator comprises a brushless motor causing a cogging effect on said stirrer for driving the stirrer in a stepping rotation wherein the stirrer is helicoidally shaped and includes at least one scraper for contacting and removing ice formation on the batch freezer.

2. A machine as claimed in claim 1, wherein the said brushless motor has a first rotation axis (X1), and said stirrer has a second rotation axis (X2), said first and second rotation axes (X1, X2) being substantially coincident.

3. A machine as claimed in claim 1, wherein said brushless motor comprises an output shaft and said stirrer has a rotation shaft, said output shaft being directly connected to said stirrer, so that said output shaft and stirrer are substantially coaxial.

4. A machine as claimed in claim 1, wherein said brushless motor comprises:
   a stator;
   a rotor having at least one permanent magnet, said at least one permanent magnet being mounted on said stirrer.

5. A machine as claimed in claim 4, wherein said at least one permanent magnet is mounted on the rotation shaft of said stirrer.

6. A machine as claimed in claim 4, wherein said stirrer is not equipped with a rotation shaft.

7. A machine as claimed in claim 1, wherein said batch freezer comprises a batch freezer chamber in which said stirrer and permanent magnets of said brushless motor are housed, a stator of said brushless motor being mounted externally of said batch freezer chamber.

8. A machine as claimed in claim 1, further comprising a control unit acting on said at least one actuator for adjusting operation of said at least one actuator.

9. A machine as claimed in claim 8, wherein said control unit adjusts operation of said at least one actuator, depending on at least one chosen from currents and voltages absorbed by the at least one actuator.

10. A machine as claimed in claim 1, wherein said treatment circuit comprises a thermal treatment mechanism acting on at least one chosen from said base product and said ice cream.

11. A machine as claimed in claim 10, wherein said thermal treatment mechanism is associated with said at least one actuator to at least partly cool said at least one actuator.

12. A machine as claimed in claim 11, wherein said brushless motor comprises a stator and a rotor;
   said thermal treatment mechanism being associated with said brushless motor for cooling said stator.

13. A machine as claimed in claim 12, and further comprising at least one power device adapted to regulate said brushless motor, said at least one power device being integrated into said stator.

14. A machine as claimed in claim 1, wherein said brushless motor has a cogging greater than 20%.

15. A machine as claimed in claim 1, wherein the scraper is angled with respect to the batch freezer to impose both a circumferential and an axial action on the ice formation.

16. A machine for producing and dispensing ice cream, comprising: a holding tank for a liquid base product; a treatment circuit for said liquid base product, so as to obtain ice cream, said treatment circuit comprising a batch freezer provided with at least one stirrer, a mechanism for dispensing said ice cream; at least one actuator acting on at least one chosen from said base product, said ice cream and parts of said machine, wherein said at least one actuator comprises a brushless motor causing a cogging effect on said stirrer for driving the stirrer in a stepping rotation; wherein the stirrer includes at least one scraper for contacting and removing ice formation on the batch freezer the scraper being angled with respect to the batch freezer to impose both a circumferential and an axial action on the ice formation.

* * * * *